(12) United States Patent
Sano

(10) Patent No.: US 6,395,079 B1
(45) Date of Patent: May 28, 2002

(54) INK SET HAVING EXCELLENT COLOR REPRODUCTION

(75) Inventor: Tsuyoshi Sano, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/533,629

(22) Filed: Mar. 22, 2000

(30) Foreign Application Priority Data

Mar. 24, 1999 (JP) ............................. 11-080491
Feb. 29, 2000 (JP) ............................. 2000-053241

(51) Int. Cl.⁷ ............................................... C09D 11/00
(52) U.S. Cl. ............................. 106/31.59; 106/31.58; 106/31.86; 106/31.89
(58) Field of Search ................... 106/31.59, 31.89, 106/31.86, 31.58

(56) References Cited

U.S. PATENT DOCUMENTS

| | | | |
|---|---|---|---|
| 5,131,916 A | | 7/1992 | Eichenauer et al. ............ 8/527 |
| 5,900,899 A | * | 5/1999 | Ichizawa et al. ............. 347/100 |
| 6,033,463 A | * | 3/2000 | Yui et al. ................... 106/31.27 |
| 6,153,000 A | * | 11/2000 | Erdtmann ..................... 106/31.6 |
| 6,153,001 A | * | 11/2000 | Suzuki et al. ............. 106/31.65 |
| 6,204,307 B1 | * | 3/2001 | Miyabayashi ................ 523/160 |

FOREIGN PATENT DOCUMENTS

| | | |
|---|---|---|
| EP | 0344379 | 12/1989 |
| EP | 0465124 | 1/1992 |
| JP | 57(1982)-107848 | 7/1982 |
| JP | 03(1991)-79680 | 4/1991 |
| JP | 03(1991)-252467 | 11/1991 |
| JP | 07(1995)-125220 | 5/1995 |

OTHER PUBLICATIONS

JPO Abstract 57(1982)–107848, Jul. 5, 1982.
JPO Abstract 03(1991)–79680, Apr. 4, 1991.
JPO Abstract 03(1991)–252467, Nov. 11, 1991.
JPO Abstract 07(1995)–125220, May 16, 1995.

* cited by examiner

Primary Examiner—C. Melissa Koslow
Assistant Examiner—Veronica F. Faison
(74) Attorney, Agent, or Firm—Ladas & Parry

(57) ABSTRACT

An ink set is provided which can realize images having excellent color reproduction.

A yellow ink composition comprising C.I. Pigment Yellow 128 as a colorant, a magenta ink composition comprising C.I. Pigment Red 122 as a colorant, a cyan ink composition comprising C.I. Pigment Blue 15:3 as a colorant, and a black ink composition comprising carbon black as a colorant can be used in combination to realize images having excellent color reproduction and fastness properties.

29 Claims, 1 Drawing Sheet

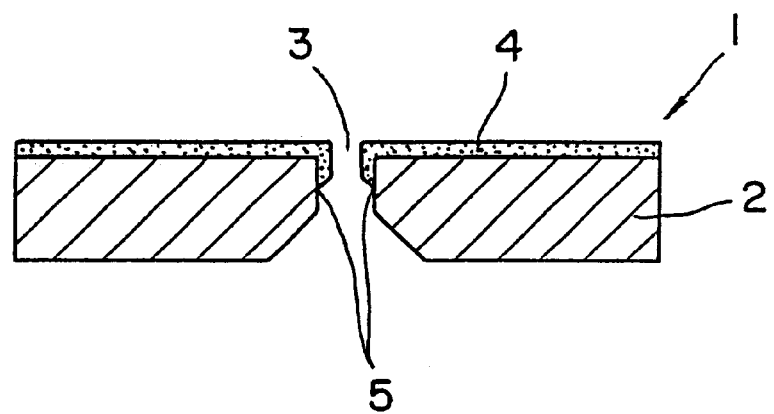
F I G. 1
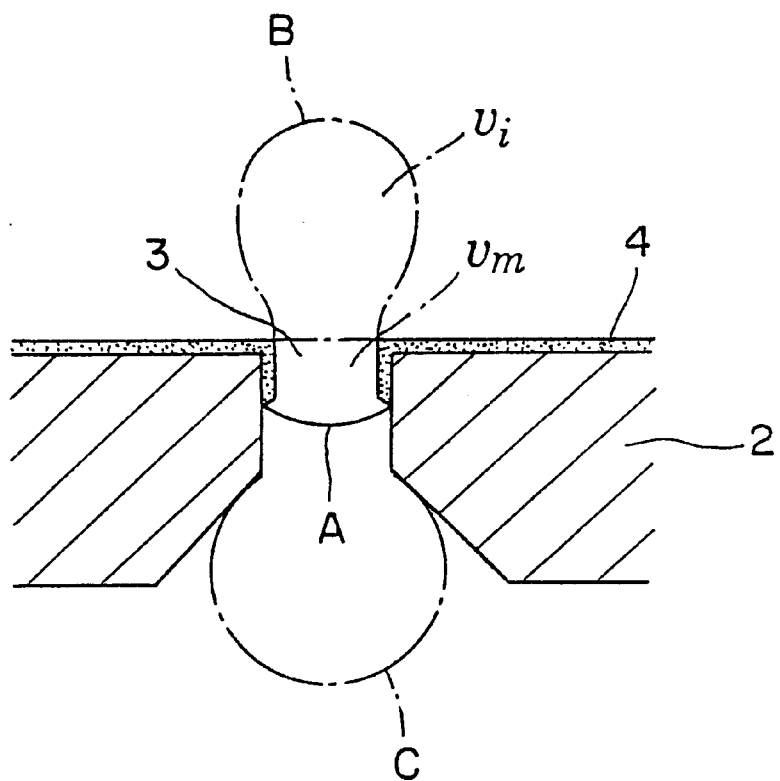
F I G. 2

INK SET HAVING EXCELLENT COLOR REPRODUCTION

BACKGROUND OF THE INVENTION

1. Field of the Invention

The present invention relates to a pigment-based ink set and a pigment-based yellow ink composition which can realize images having excellent color reproduction and excellent fastness properties.

2. Background Art

Ink jet recording is a printing method wherein droplets of an ink composition are ejected and deposited onto a recording medium, such as paper, to conduct printing. This method has a feature that an image having high resolution and high quality can be printed at a high speed by means of relatively inexpensive apparatuses.

In general, the ink composition used in the ink jet recording comprises water as a main component and, added thereto, a colorant component and a wetting agent, such as glycerin, for preventing clogging and other purposes. A large number of water-soluble dyes have been used as colorants for use in ink compositions for ink jet recording from the viewpoints of high chromas of colorants, an abundance of types of utilizable colorants, solubility in water and the like.

The dyes, however, often have poor lightfastness, waterfastness and other various properties. Therefore, prints obtained using dye ink compositions have poor lightfastness and wasterfastness. The waterfastness has been improved through the use of specialty recording papers having an ink absorptive layer for ink jet recording. For plain papers, however, the improvement in waterfastness is still unsatisfactory.

Pigments, as compared with the dyes, have superior lightfastness and waterfastness. This has recently led to studies on utilization of pigments as colorants in the ink composition for ink jet recording from the viewpoint of improving the lightfastness and waterfastness of printed images. In this case, since pigments are generally insoluble in water, when a pigment is used in a water-based ink composition, a method should be used which comprises mixing the pigment with a resin or the like called a "dispersant" to prepare a mixture, stably dispersing the mixture in water, and then preparing an ink composition using the dispersion.

In order to stably disperse pigments in a water system, studies should be made on the kind and particle diameter of pigment, the kind of resin used, dispersing means and the like. Up to now, a large number of dispersing methods and inks for Ink jet recording have been proposed in the art. For example, Japanese Patent Laid-Open No. 252467/1991 proposes an ink composition comprising water, a styrene/maleic acid copolymer, ε-caprolactam, and a pigment, and Japanese Patent Laid-Open No. 79680/1991 proposes an ink composition comprising an aqueous medium, a styrene/maleic acid copolymer, and a copper phthalocyanine pigment.

Further, for ink compositions comprising pigments as the colorant, a task to be accomplished is to improve the rubbing/scratch resistance of printed images. Specifically, unlike dyes penetrable into recording media, pigments stay on the surface of recording media, making it necessary to improve the rubbing/scratch resistance using some means.

When utilization of pigments as the colorant for inks for ink jet recording is considered, as compared with dyes, pigments have superior lightfastness and waterfastness, but on the other hand are smaller in number of kinds of usable colorants. in practical use of inks for ink jet recording, hue besides lightfastness and waterfastness should be sufficiently studied.

Furthermore, a proposal has been made for enhancing the penetration of the ink composition, shortening the drying time, and forming a large pixel (for example, a dot) using a smaller amount of the ink. In pigment-based ink compositions, however, no satisfactory penetration is often provided due to the relation with the pigments and other ingredients.

Further, in recent years, formation of color images by ink jet recording using a plurality of color ink compositions has been performed in the art. Color images are generally formed using three colors of a yellow ink composition, a magenta ink composition, and a cyan ink composition, and, in some cases, four colors of the above three color compositions plus a black ink composition. What is required of ink compositions for the formation of such color images is that they as such can exhibit good color development and, in addition, when used in combination with a plurality of ink compositions can develop good intermediate colors and black.

In such color images, the presence of even one color having poor lightfastness causes a change in hue of images which results in extremely deteriorated color image quality. Accordingly, more regulated lightfastness is required of color ink compositions. Among others, images printed by an ink jet recording printer are considered utilizable in various forms. In particular, for example, photograph-like prints are considered to be put as displays for a long period of time in places exposed to light from fluorescent lamps or places exposed to direct sunlight in the open and the like. For this reason, lightfastness is a very important property required of images formed by the ink jet recording method.

C.I. Pigment Yellow 74 has hitherto been extensively used as a colorant for yellow inks, This pigment exhibits much better yellow color development than other pigment-based colorants. For C.I. Pigment Yellow 74, however, there is room for further improvement in lightfastness.

On the other hand, realization of good images free from feathering or bleeding on recording media and, in addition, sure ejection through nozzles in an ink jet recording head without deviation from a predetermined droplet trajectory direction are required of ink compositions for ink jet recording. A failure of the ink to be ejected or ejection of ink droplets in a direction deviated from the predetermined ink droplet trajectory direction (the deviation of ink droplets from a predetermined ink droplet trajectory direction being hereinafter often referred to as "ink droplet trajectory directionality problem") results in dropouts, lowered sharpness of images, and other unfavorably phenomena. In order to prevent the failure of the ink to be ejected or the ink droplet trajectory problem, various proposals have been made on the regulation of the kind and amount of ingredients added to the ink composition. Further, several proposals have been made on the construction of an ink jet recording head which is less likely to cause the ink droplet trajectory directionality problem. For the latter, for example, a method has been proposed which imparts, to a nozzle plate, a property such that the nozzle plate is less likely to be wetted by the ink (ink-repellent properties), thereby permitting ink droplets to be ejected surely and without any ink droplet trajectory directionality problem. For example, Japanese Patent Laid-Open No. 107848/1982 proposes that an ink-repellent coating of a fluororesin or the like is evenly formed by sputtering on the internal surface of nozzles and the surface of the nozzle plate to prevent the ink from being leaked from around the nozzles. Further, Japanese Patent Laid-Open No. 125220/1995 proposes the provision of an ink-repellent coating which extends to the internal surface of nozzles to such a predetermined extent as determined in a relationship with the amount of the ink in droplets.

SUMMARY OF THE INVENTION

The present inventors have now found that an ink set comprising a combination of color ink compositions respectively containing specific pigments can realize images having excellent color reproduction. The present inventors have further found that a combination of the color ink compositions with the ink jet recording method using an ink jet recording head provided with a nozzle plate described in Japanese Patent Laid-Open No. 125220/1995 can suppress the failure of the ink droplets to be ejected and the ink droplet trajectory directionality problem and can cope with high response frequencies. Furthermore, the present inventors have found that a yellow ink composition containing C.I. Pigment Yellow 128 can realize images having excellent color reproduction and lightfastness. The present invention has been made based on such finding.

Accordingly, it is an object of the present invention to provide a pigment-based ink set, a yellow ink composition containing C.I. Pigment Yellow 128, and image recording methods using the same, which can realize images having excellent color reproduction.

According to one aspect of the present invention, there is provided an ink set comprising at least a yellow ink composition, a magenta ink composition, a cyan ink composition, and a black ink composition, said yellow ink composition comprising C.I. Pigment Yellow 128 as a colorant, said magenta ink composition comprising C.I. Pigment Red 122 as a colorant, said cyan ink composition comprising C.I. Pigment Blue 15: 3 as a colorant, said black ink composition comprising carbon black as a colorant.

According to a further aspect of the present invention, there is provided a yellow ink composition comprising: 1 to 5% by weight of C.I. Pigment Yellow 128; a water-soluble resin based on styrene-(meth)acrylic acid; 0.1 to 30% by weight of glycerin; 1 to 20% by weight of triethylene glycol monobutyl ether; 0.1 to 5% by weight of an acetylene glycol; and a water-soluble organic solvent.

BRIEF DESCRIPTION OF THE DRAWINGS

FIG. 1 is a diagram showing the construction of a nozzle plate in an ink jet recording head used with the ink composition according to the present invention; and FIG. 2 is an enlarged view of the nozzle plate shown in FIG. 1.

DETAILED DESCRIPTION OF THE INVENTION

The ink set according to the present invention may be used in recording methods using an ink composition. Recording methods using an ink composition include, for example, an ink jet recording method, a recording method using writing utensils, such as pens, and other various printing methods. Particularly preferably, the ink set according to the present invention can be used in the ink jet recording method.

Ink set

The ink set according to the present invention basically comprises a cyan ink composition, a magenta ink composition, a yellow ink composition, and a black ink composition, the yellow ink composition comprising C.I. Pigment Yellow 128 as a colorant, the magenta ink composition comprising C.I. Pigment Red 122 as a colorant, the cyan ink composition comprising C.I. Pigment Blue 15:3 as a colorant, the black ink composition comprising carbon black as a colorant. These ink compositions containing specific pigments can be used in combination to form images having excellent color reproduction. Since the above pigments as such have high lightfastness, the formed images have excellent fastness properties.

The content of the pigment in each ink composition constituting the ink set according to the present invention may be properly determined. the pigment content, however, is preferably about 1 to 5% by weight, more preferably 1.5 to 4% by weight.

According to a preferred embodiment of the present invention, the content of carbon black is generally not more than 3.0% by weight, preferably not more than 2.5% by weight, more preferably not more than 2.0% by weight, based on the black ink composition. Reducing the content of the carbon black, when used in printing of a color image together with other ink compositions on recording media, can yield images having better black reproduction.

According to a preferred embodiment of the present invention, these pigments are added, to the ink compositions, as a pigment dispersion prepared by dispersing the pigment in an aqueous medium with the aid of a dispersant or a surfactant. Preferred dispersants include those commonly used in the preparation of pigment dispersions, for example, polymeric dispersants.

Examples of preferred dispersants usable herein include cationic, anionic, and nonionic dispersants. Examples of anionic dispersants usable herein include polyacrylic acid, polymethacrylic acid, acrylic acid-acrylonitrile copolymer, vinyl acetate-acrylic ester copolymer, acrylic acid-alkyl acrylate copolymer, styrene-acrylic acid copolymer, styrene-methacrylic acid copolymer, styrene-acrylic acid-alkyl acrylate termpolymer, styrene-methacrylic acid-alkyl acrylate terpolymer, styrene-α-methylstyrene-acrylic acid copolymer, styrene-α-methylstyrene-acrylic acid-alkyl acrylate copolymer, styrene-maleic acid copolymer, vinylnaphthalene-maleic acid copolynmer, vinyl acetate-ethylene copolymer, vinyl acetate-fatty acid vinylethylene copolymer, vinyl acetate-maleic ester copolymer, vinyl acetate-crotonic acid copolymer, and vinyl acetate-acrylic acid copolymer. Examples of anionic surfactants usable herein include sodium dodecylbenzenesulfonate, sodium laurylate, and an ammonium salt of polyoxyethylene alkyl ether sulfates. Examples of nonionic surfactants usable herein include polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides. They may be used alone or in combination of two or more. According to a preferred embodiment of the present invention, the dispersant is a water-soluble resin based on a styrene-(meth)acrylic acid copolymer.

The formulation of the ink composition according to the present invention may be properly determined by taking recording methods and the like into consideration. Preferably, the ink composition basically comprises the above colorant, water, and a water-soluble organic solvent.

An example of the water-soluble organic solvent is a high-boiling organic solvent. The high-boiling organic solvent functions to prevent the ink composition from drying out, thereby preventing clogging of the head. Preferred examples of high-boiling organic solvents usable herein include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine. Although the amount of the high-boiling organic solvent added is not particularly limited, it is preferably about 0.1 to 30% by weight, more preferably about 0.5 to 20% by weight.

The ink composition may further contain a low-boiling organic solvent as a water-soluble organic solvent. Examples of preferred low-boiling organic solvents usable herein include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink composition.

According to a preferred embodiment of the present invention, the ink composition may further contain a penetrant. Penetrants usable herein include: various surfactants, such as anionic, cationic, and amphoteric surfactants; alcohols, such as methanol, ethanol, and iso-propyl alcohol; and lower alkyl ethers of polyhydric alcohols, such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether. Diethylene glycol monobutyl ether or triethylene glycol monobutyl ether is particularly preferred. Although the amount of the penetrant added may be properly determined, it is preferably about 1 to 20% by weight, more preferably about 1 to 10% by weight.

Examples of penetrants include acetylene glycols represented by the following formula (I):

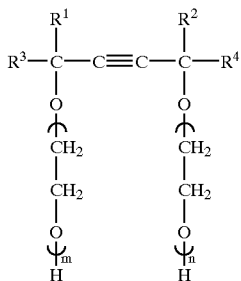

wherein $0 \geq m+n \geq 50$; and $R^1$, $R^2$, $R^3$, and $R^4$ each independently represent an alkyl group.

Commercially available products may be used as the acetylene glycols represented by the formula (I). Specific examples thereof include OLFINE Y and Surfynol 82, Surfynol 440, Surfynol 465, and Surfynol 485, (all the above products being manufactured by Air products and Chemicals Inc.). Surfynol 465 is particularly preferred. They may be added alone or in combination of two or more. The amount of the penetrant added is preferably in the range of from about 0.1 to 5% by weight, more preferably 0.5 to 2% by weight.

Yellow Ink Composition

According to a further aspect of the present invention, there is provided a yellow ink composition.

The ingredients constituting the yellow ink composition according to the present invention and the contents of these ingredients may be the same as the ingredients constituting the yellow ink composition in the ink set according to the present invention and the contents of these ingredients.

Specifically, the yellow ink composition according to the present invention comprises about 1 to 5% by weight (preferably about 1.5 to 4% by weight) of C.I. Pigment Yellow 128, a water-soluble resin based on styrene-(meth)acrylic acid, about 0.1 to 30% by weight (preferably about 0.5 to 20% by weight) of glycerin, about 1 to 20% by weight (preferably about 1 to 10% by weight) of triethylene glycol monobutyl ether, about 0.1 to 5% by weight (preferably about 0.5 to 2% by weight) of an acetylene glycol, and a water-soluble organic solvent.

According to a preferred embodiment of the present invention, in the yellow ink composition, the water-soluble resin based on a styrene-(meth)acrylic acid copolymer is a styrene-(meth)acrylic acid copolymer, the acetylene glycol is a compound represented by formula (I), and the water-soluble organic solvent is preferably ethylene glycol, diethylene glycol, or triethanolamine.

Nozzle Plate

The ink set according to the present invention is preferably used in an ink jet recording method using an ink jet recording head provided with a nozzle plate described in Japanese Patent Laid-Open No. 125220/1995. The basic structure of this nozzle plate is as shown in FIG. 1. In the nozzle plate 1, a nozzle 3 is provided in a substrate 2. An ink-repellent coating 4 is provided on the substrate 2 and, in addition, extends along the internal surface of the nozzle 3 to a position 5 on the internal surface of the nozzle 3. FIG. 2 is an enlarged view of a portion around the nozzle 3. Upon loading of the ink composition into the ink jet recording head provided with a nozzle plate having the above structure, a vibrating face of a meniscus of the ink composition is created which is in the form of a line connecting bottom edges 5 of the ink-repellent coating within the nozzle 3 to each other. The position of vibration center A is as shown in FIG. 2. In ejecting the ink composition, an ink droplet is ejected in such a form as indicated by B in FIG. 2 and then leaves the nozzle. After the ink ejection, the ink composition is once pulled back to a position indicated by C in FIG. 2. The ink composition, however, is soon returned to the vibration position A of the meniscus. In the nozzle plate described in this publication, the position of the bottom edge 5 of the ink-repellent coating is determined so that the space volume of the nozzle in its internal portion from the surface of the nozzle plate 1 to the vibration center A of the meniscus, Vm, is in the range of 0.05 to 0.50 based on the volume from the surface 4 of the nozzle 3 to the front face B of the ink just before the ejection, that is, the amount of the ink droplet ejected, Vi.

According to a preferred embodiment of the present invention, the ink-repellent coating is formed by immersing a nozzle plate member in an electrolyte containing nickel ions and particles of a water-repellent polymeric resin, such as polytetrafluoroethylene, dispersed by charges, and forming a codeposit on the surface of the nozzle plate 1 while stirring the electrolyte. Fluoropolymeric materials usable in the codeposition include polytetrafluoroethylene, polyperfluoroalkoxybutadiene, polyfluorovinylidene, polyfluorovinyl, and polydiperfluoroalkyl fumarate. These resins may be used alone or as a mixture of two or more.

EXAMPLES

The present invention will be described in more detail with reference to the following examples, though it is not limited to these examples only. In the following examples, "%" is by weight unless otherwise specified.

The unit "duty" used herein is a unit of a value D defined and calculated by equation (I):

$$D = \frac{\text{number of actually printed dots}}{\text{longitudinal resolution} \times \text{transverse resolution}} \times 100 \text{ (duty)} \quad (I)$$

Preparation of Ink Composition

The following ink compositions were prepared by a conventional method. Specifically, a colorant component, together with a dispersant component, was dispersed. The other ingredients were then added to and mixed with the dispersion. Insolubles having a certain size or larger were removed by filtration to prepare an ink composition. The ink compositions thus prepared were used in combination to prepare an ink set.

| Ink set A Black ink | |
|---|---|
| Carbon black | 2.5% |
| Dispersant (styrene/acrylic acid copolymer) (solid basis) | 0.9% |
| Glycerin | 13% |
| Diethylene glycol | 3% |
| Ethylene glycol | 5% |
| Surfynol 465 | 1% |
| Pure water | Balance |
| Yellow ink | |
| C.I. Pigment Yellow 128 | 2.5% |
| Dispersant (styrene/acrylic acid copolymer) (solid basis) | 1.5% |
| Glycerin | 15% |
| Triethanolamine | 0.6% |
| Ethylene glycol | 4% |
| Surfynol 465 | 1% |
| Diethylene glycol monobutyl ether | 5% |
| Pure water | Balance |
| Magenta ink | |
| C.I. Pigment Red 122 | 3.1% |
| Dispersant (styrene/acrylic acid copolymer) (solid basis) | 1.0% |
| Glycerin | 14% |
| Diethylene glycol | 3% |
| Triethylene glycol monobutyl ether | 8% |
| Surfynol 465 | 0.8% |
| Pure water | Balance |
| Cyan ink | |
| C.I. Pigment Blue 15:3 | 2.5% |
| Dispersant (styrene/acrylic acid copolymer) (solid basis) | 0.6% |
| Glycerin | 12% |
| Diethylene glycol | 3% |
| Ethylene glycol | 5% |
| Surfynol 465 | 1% |
| Triethylene glycol monobutyl ether | 5% |
| Pure water | Balance |
| Ink set B Black ink | |

-continued

| | |
|---|---|
| Carbon black | 2.1% |
| Dispersant (styrene/acrylic acid copolymer) (solid basis) | 0.5% |
| Glycerin | 15% |
| Ethylene glycol | 5% |
| Triethanolamine | 0.7% |
| Surfynol 465 | 1% |
| Diethylene glycol monobutyl ether | 8% |
| Pure water | Balance |
| Yellow ink | |
| C.I. Pigment Yellow 128 | 3.5% |
| Dispersant (styrene/acrylic acid copolymer) (solid basis) | 1.2% |
| Glycerin | 7% |
| Ethylene glycol | 4% |
| Triethanolamine | 0.8% |
| Surfynol 465 | 1% |
| Triethylene glycol monobutyl ether | 3% |
| Pure water | Balance |
| Magenta ink | |
| C.I. Pigment Red 122 | 3.4% |
| Dispersant (styrene/acrylic acid copolymer) (solid basis) | 1.5% |
| Glycerin | 15% |
| Ethylene glycol | 7% |
| Triethanolamine | 0.7% |
| Surfynol 465 | 0.8% |
| Triethylene glycol monobutyl ether | 5% |
| Pure water | Balance |
| Cyan ink | |
| C.I. Pigment Blue 15:3 | 2.1% |
| Dispersant (styrene/acrylic acid copolymer) (solid basis) | 0.8% |
| Glycerin | 18% |
| Diethylene glycol | 7% |
| Triethanolamine | 0.7% |
| Surfynol 465 | 1% |
| Pure water | Balance |
| Ink set C Black ink | |
| Carbon black | 5.1% |
| Dispersant (styrene/acrylic acid copolymer) (solid basis) | 2.4% |
| Glycerin | 12% |
| Diethylene glycol | 3% |
| Surfynol 465 | 1% |
| Triethylene glycol monobutyl ether | 5% |
| Ethylene glycol | 5% |
| Pure water | Balance |

The yellow ink, magenta ink, and cyan ink used were those prepared for use in ink set B.

Print evaluation test

Printing was carried out using the ink sets, prepared above, by means of an ink jet printer "MJ-93011" manufactured by Seiko Epson Corp. on a specialty recording medium for ink jet recording (a specialty gloss film, manufactured by Seiko Epson Corp.). In the printing, the amount of ink ejected was 0.040 μg per dot, and the resolution was 360 dpi×360 dpi.

Evaluation test 1: Color reproduction

Ink sets A and B were used to print single colors of yellow, magenta, and cyan and blue, green, and red by mixing of colors. The colors were measured with a Macbeth CE-7000 spectrophotometer (manufactured by Macbeth) to determine the coordinates of L*a*b* color system of the color difference indication method specified in CIE (Commission International de l'Eclairage). Separately, printing was carried out using genuine ink compositions for an ink jet printer MJ-930C. For colors of the prints thus obtained, the coordinates of L*a*b* color system of the color difference indication method specified in CIE were determined in the same manner as described above.

The genuine dye ink compositions for the ink jet printer MJ-930C were different from the ink compositions constituting the ink sets in hue of the colorants. Therefore, for accurate comparison of the genuine ink compositions with the ink compositions constituting the ink sets, the chroma C* was determined for the ink compositions, and used as a quantitative value for the evaluation.

The chroma C* is defined by the following equation:
$C^* = ((a^*)^2 + (b^*)^2)^{1/2}$ The chroma values were as shown in Table 1 below.

TABLE 1

|  | MJ-930C | Ink set A | Ink set B |
|---|---|---|---|
| Yellow | 95.1 | 93.3 | 92.5 |
| Green | 68.0 | 83.8 | 80.9 |
| Cyan | 61.8 | 69.9 | 67.5 |
| Blue | 71.0 | 84.9 | 85.2 |
| Magenta | 81.4 | 82.7 | 84.1 |
| Red | 96.0 | 95.9 | 95.9 |

As is apparent from Table 1, in the case of single colors, the chroma for the ink compositions constituting the ink sets A and B was equal to or only not more than 5% lower than the chroma for the genuine ink compositions for MJ-930C, while, in the case of color mixtures, particularly in the case of green and blue, the chroma was much higher than the chroma for the genuine ink compositions for Mi-930C.

Evaluation test 2: Lightfastness

Blotted images (1004 duty) were printed using the ink sets A and B. The lightfastness of the prints thus obtained was evaluated under the following conditions.

The prints were first irradiated with light by means of a xenon weather-o-meter Ci35A (manufactured by ATLAS) under conditions of black panel temperature 63°C., relative humidity 50%, and 340 nm ultraviolet irradiance 0.35 W/m$^2$. The irradiation time was 284 hr at 360 kJ/m$^2$ or 568 hr at 720 kJ/m$^2$.

After the irradiation, the reflection density of the prints was measured with a spectrophotometer GRETAG SPM (manufactured by GRETAG) under conditions of light source D50, provision of no light source filter, absolute white as reference white, and angle of visibility 2°. As a result, for all of yellow, magenta, cyan, and black, the percentage residual density exceeded 90%.

Evaluation test 3: Image quality

Only black inks in the ink sets A, B, and C were used to form black blotted images (100% duty) on a recording medium having a size of 10 cm×10 cm. In this case, an image of a woman in ISO/JIS-SCID high-definition color digital standard image data/Japanese Standards Association: Name of file "nl.tif" was used as a print object. For the prints, the black reproduction was evaluated as follows.

At the outset, shade and shadow portions of the image, such as the shade of the image object and the person's hair, were visually inspected for lackluster (the term "lackluster" referring to the degree of loss of gloss). As a result, the ink sets A and B yielded good images free from lackluster. On the other hand, images yielded by the ink set C suffered from slight lackluster.

The gloss of the images in the prints was then measured. The gloss was measured with PG-IM manufactured by Nippon Denshoku Co., Ltd. under conditions of angles of incidence 20 degrees, 65 degrees, and 85 degrees. The results were summarized in Table 2 below.

TABLE 2

|  | 20 degrees | 60 degrees | 85 degrees |
|---|---|---|---|
| Ink set A | 71.1 | 95.5 | 98.8 |
| Ink set B | 75.3 | 94.9 | 97.5 |
| Ink set C | 45.6 | 74.3 | 88.2 |

As is apparent from Table 2, the ink set C comprising a black ink having a carbon black content of more than 3.0% by weight yielded images which had low gloss and suffered from lackluster.

Evaluation test 4: Printing stability

The ink compositions constituting the ink sets A to C were continuously printed by means of an ink jet printer MJ-930C for a long period of time at room temperature. The prints were inspected for dropouts and scattering of the ink. The results were evaluated according to the following criteria. The results of evaluation are shown in Table 3 below.

A: At the end of printing for 48 hr, the number of times of dropouts or scattering of the ink was less than 10.

B: At the end of printing for 48 hr, the number of times of dropouts or scattering of the ink was 10.

C: At the end of printing for 24 hr, the number of times of dropouts or scattering of the ink was 10.

D: At the end of printing for 24 hr, the number of times of dropouts or scattering of the ink was more than 10.

TABLE 3

| Ink set | Evaluation | | | |
|---|---|---|---|---|
|  | Black | Cyan | Yellow | Magenta |
| A | A | A | A | A |
| B | A | A | A | A |
| C | B | — | — | — |

What is claimed is:

1. An ink set comprising at least a yellow ink composition, a magenta ink composition, a cyan ink composition, and a black ink composition, said yellow ink composition comprising C.I. Pigment Yellow 128 as a colorant, said magenta ink composition comprising C.I. Pigment Red 122 as a colorant, said cyan ink composition comprising C.I. Pigment Blue 15:3 as a colorant, said black ink composition comprising carbon black as a colorant.

2. The ink set according to claim 1, wherein the content of the colorant in the ink composition is 1 to 5 by weight.

3. The ink set according to claim 1, wherein the content of the carbon black is not more than 3.0% by weight based on the black ink composition.

4. The ink set according to claim 1, wherein the ink composition contains a dispersant and/or a penetrating agent.

5. The ink set according to claim 4, wherein the dispersant is a water-soluble resin based on a styrene-(meth)acrylic acid copolymer.

6. The ink set according to claim 4, wherein the penetrating agent is a lower alkyl ether of a polyhydric alcohol and/or an acetylene glycol.

7. The ink set according to claim 6, wherein the content of the lower alkyl ether of the polyhydric alcohol is 1 to 20% by weight.

8. The ink set according to claim 6, wherein the content of the acetylene glycol is 0.1 to 5% by weight.

9. The ink set according to claim 6, wherein the lower alkyl ether of the polyhydric alcohol is diethylene glycol monobutyl ether or triethylene glycol monobutyl ether.

10. The ink set according to claim 6, wherein the acetylene glycol is represented by formula (I):

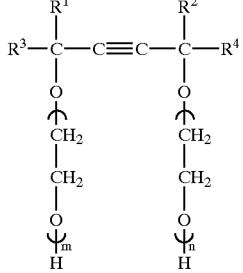

wherein $0 \leq m+n \leq 50$; and $R^1$, $R^2$, $R^3$, and $R^4$ each independently represent an alkyl group.

11. The ink set according claim 1, which is used in an ink jet recording method.

12. A recording method comprising the step of depositing an ink composition onto a recording medium to perform printing, wherein the ink composition is one in the ink set according to claim 1.

13. An ink jet recording method comprising the steps of ejecting droplets of an ink composition; and depositing the droplets onto a recording medium to perform printing, wherein the ink composition is one in the ink set according to claim 1.

14. A record produced by the method according to claim 12.

15. An ink jet recording method comprising the steps of: ejecting droplets of an ink composition; and depositing the droplets onto a recording medium to perform printing, wherein the ink composition is one in the ink set according to claim 1 and an ink jet recording head provided with a nozzle plate, which has been treated for rendering the nozzle plate ink-repellent, is used.

16. The ink jet recording method according to claim 15, wherein the ink jet recording head is provided with a nozzle plate, said nozzle plate having, on its surface, an ink-repellent coating which extends along the inner surface of the nozzle to such an extent that the space volume of the nozzle in its internal portion from the surface of the nozzle plate to a meniscus forming face is in the range of 0.05 to 0.50 based on the amount of the ink ejected.

17. The ink jet recording method according to claim 16, wherein the ink-repellent coating has been formed by codeposition.

18. A record produced by the ink jet recording method according to claim 15.

19. A yellow ink composition comprising: 1 to 5% by weight of C.I. Pigment Yellow 128; a water-soluble resin based on styrene-(meth)acrylic acid; 0.1 to 30% by weight of glycerin; 1 to 20% by weight of triethylene glycol monobutyl ether; 0.1 to 5% by weight of an acetylene glycol; and a water-soluble organic solvent.

20. The ink composition according to claim 19, wherein the water-soluble resin based on styrene-(meth)acrylic acid is a styrene-(meth)acrylic acid copolymer.

21. The ink composition according to claim 19, wherein the acetylene glycol is a compound represented by formula (I):

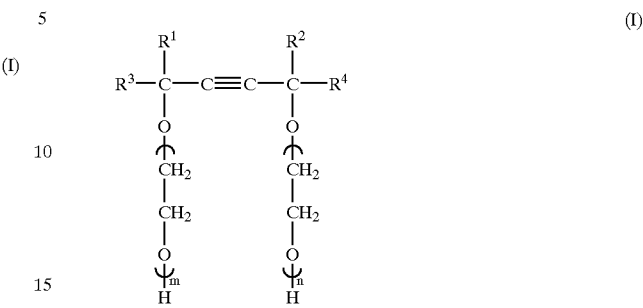

wherein $0 \leq m+n \leq 50$; and $R^1$, $R^2$, $R^3$, and $R^4$ each indmendently represent an alkyl group.

22. The ink composition according to claim 19, wherein the water-soluble organic solvent is ethylene glycol, diethylene glycol, or triethanolamine.

23. The ink composition according to claim 19, for use in an ink jet recording method comprising the steps of: ejecting droplets of an ink composition; and depositing the droplets onto a recording medium to perform printing.

24. A print produced by printing using the ink composition according to claim 19.

25. An ink jet recording method comprising the steps of: ejecting droplets of an ink composition; and depositing the droplets onto a recording medium to perform printing, wherein the ink composition is one according to claim 19 and an ink jet recording head provided with a nozzle plate, which has been treated for rendering the nozzle plate ink-repellent, is used.

26. The ink jet recording method according to claim 25, wherein the ink jet recording head is provided with a nozzle plate, said nozzle plate having, on its surface, an ink-repellent coating which extends along the inner surface of the nozzle to such an extent that the space volume of the nozzle in its internal portion from the surface of the nozzle plate to a meniscus forming face is in the range of 0.05 to 0.50 based on the amount of the ink ejected.

27. The ink jet recording method according to claim 26, wherein the ink-repellent coating has been formed by codeposition.

28. A record produced by the ink jet recording method according to claim 25.

29. The ink set according to claim 1, wherein the yellow ink composition is a yellow ink composition comprising: 1 to 5% by weight of C.I. Pigment Yellow 128; a water-soluble resin based on styrene-(meth)acrylic acid; 0.1 to 30% by weight of glycerin; 1 to 20% by weight of triethylene glycol monobutyl ether; 0.1 to 5% by weight of an acetylene glycol; and a water-soluble organic solvent.

* * * * *